Figure 1:
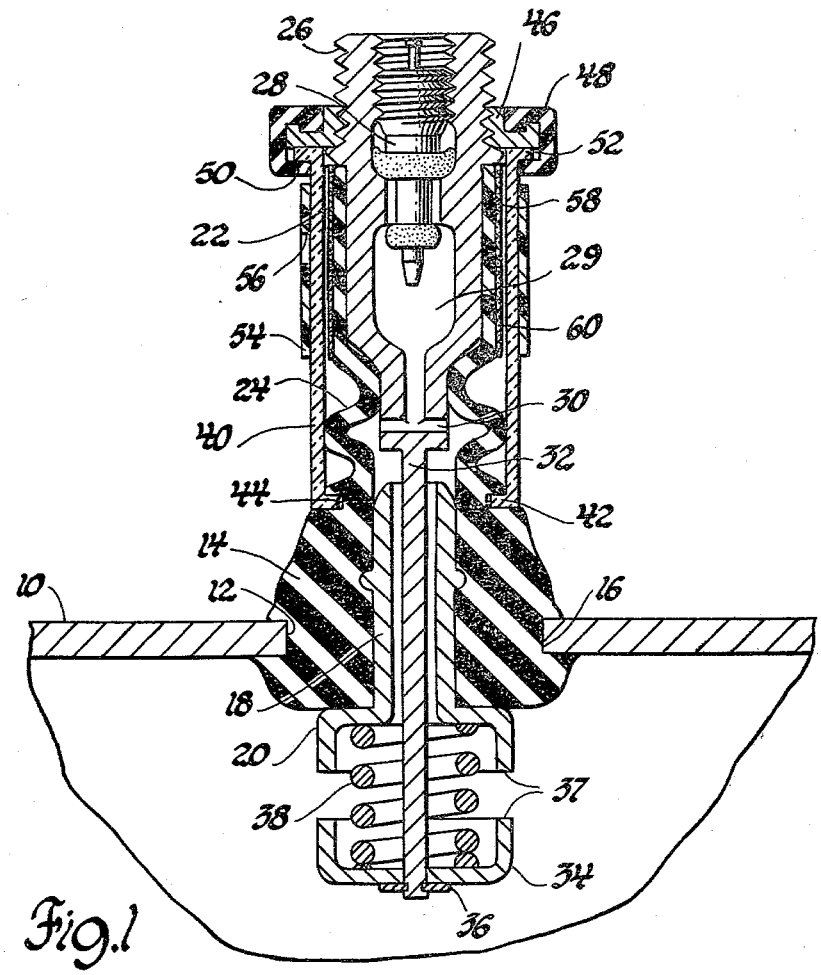

United States Patent [19]

Parker

[11] 4,310,014
[45] Jan. 12, 1982

[54] TIRE PRESSURE INDICATOR INTEGRAL WITH TIRE STEM
[75] Inventor: James E. Parker, Mt. Clemens, Mich.
[73] Assignee: General Motors Corporation, Detroit, Mich.
[21] Appl. No.: 163,707
[22] Filed: Jun. 27, 1980
[51] Int. Cl.³ .............................................. F16K 15/20
[52] U.S. Cl. .................................... 137/227; 73/146.8
[58] Field of Search ............................ 137/227, 234.5; 73/146.8

[56] References Cited
U.S. PATENT DOCUMENTS

| | | | |
|---|---|---|---|
| 3,230,968 | 1/1966 | Struby | 137/227 |
| 3,650,150 | 3/1972 | Eccles | |
| 3,811,459 | 5/1974 | Schmidt | 137/227 |
| 3,906,988 | 9/1975 | Mottram | 137/227 |
| 3,990,467 | 11/1976 | Sargent | 137/227 |

Primary Examiner—Harold W. Weakley
Attorney, Agent, or Firm—Warren D. Hill

[57] ABSTRACT

To provide a visual indication of low tire pressure, a valve stem comprises a base for mounting to a tire rim, an outer nipple portion containing a tire stem valve, and an intermediate convoluted portion connecting the base and the nipple. An inner extension of the nipple passes through the base portion and has its inner end secured to a spring which is compressed between the extension and the base portion to urge the nipple toward the tire rim against the force of the tire pressure so that the spacing of the nipple from the rim is a measure of tire pressure. A transparent cylinder surrounding the valve stem and secured to the base portion contains a window for viewing an indicia mark on the nipple, the indicia being placed to provide an indication of low tire pressure when it is visible through the window.

4 Claims, 2 Drawing Figures

TIRE PRESSURE INDICATOR INTEGRAL WITH TIRE STEM

This invention relates to a tire pressure indicator and in particular to such an indicator which is coupled with a tire valve stem.

It is desired for maintaining vehicle tires at a pressure which provides economical vehicle operation and good vehicle ride qualities to conveniently determine the need for tire pressure adjustment. Commonly a tire pressure gauge manually applied to each tire valve stem is used to provide a measure of tire pressure. It has also been proposed to provide various structures permanently mounted on the tire either in combination with the valve stem or separately for giving an indication of correct pressure or of under pressure.

This latter type of device can be very useful and it is therefore a general object of this invention to make improvements therein to enhance the reliability and readability of indicators which are combined with a tire stem.

The invention is carried out by providing a valve stem having a base attached to a tire rim, a nipple portion containing a valve, an intermediate convoluted portion which is extensible according to tire pressure, an extension of the nipple passing inwardly beyond the base portion coupled to the base portion via a balance spring which resists extension of the stem to thereby counter the tire pressure whereupon the stem extends by an amount proportional to the tire pressure, and an indicator responsive to the relative positions of the base and the nipple portion of the stem to give an indication of low tire pressure.

Figure 2:
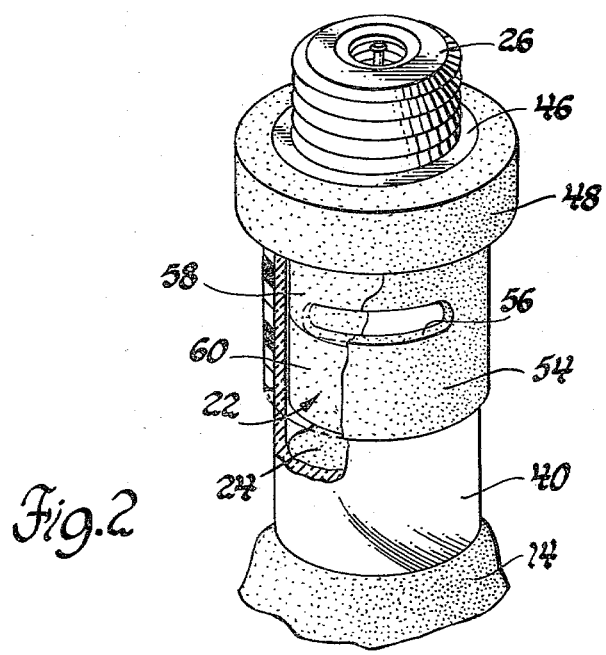

The above and other advantages will be made more apparent from the following specification taken in conjunction with the accompanying drawings wherein like reference numerals refer to like parts and wherein:

FIG. 1 is a cross-sectional view of a valve stem and low tire pressure indicator according to the invention; and FIG. 2 is a partly cross-sectioned view of the upper stem portion of the indicator of FIG. 1.

Referring to FIG. 1 a tire rim 10 containing an aperture 12 has a combined valve stem and low tire pressure indicator mounted therein. The valve stem includes a base portion 14 formed of buytl rubber and including a groove 16 for receiving the rim 10 when the base portion is press fit into the aperture 12. The base portion 14 is hollow and contains therein a metal insert 18 which is also hollow and which terminates in an outward flaring cup portion or spring retainer 20 adjacent the inner end of the base portion 14. A tubular nipple portion 22 is secured to the base portion 14 by means of an integral intermediate flexible convoluted portion 24 which is axially extensible to allow relative movement between the tubular portion 22 and the base portion 14. A metallic nipple 26 is secured within the tubular portion 22 and is threaded on both the inside and the outside. A conventional tire stem valve 28 is secured within the stem 26. The central passage 29 of the nipple extends into the valve stem as far as the convoluted portion 24 and terminates there in lateral ports 30 which connect the central passage with the hollow of the base portion so that any air admitted through the tire stem valve 28 passes through the central passage 29, the ports 30, and the hollow insert 18 into the tire. A rod-like extension 32 integral with the nipple 26 and extending axially through the insert 18 into the tire supports at its inner end a spring retainer 34 which is held in place by a fastener 36. The spring retainer 34 is cup shaped and matched in size with the spring retainer 20 so that the peripheries 37 of the spring retainers can abut one another and serve as stop members. A coil spring 38 compressed between the two spring retainers urges the nipple 26 inwardly toward the base portion 14.

A cylindrical clear high strength plastic indicator shell 40 surrounds the tubular portion 22 and the convoluted portion 24. The shell 40 has inwardly turned flanges 42 which are press fit into a groove 44 in the base portion 14 so that the shell is fixed with respect to the base portion. The outer end of the shell 40 is arranged to allow axial movement of the tubular portion 22. A retaining ring 46 threaded to the nipple 26 secures an inner flange of an annular rubber boot 48 which has an outer flange 50 surrounding an outwardly turned lip 52 of the shell 40. The boot 48 provides a dust seal to keep the space between the tubular portion 22 and the shell 40 clean and is resilient enough to allow axial movement between the nipple 26 and the shell 40.

As best shown in FIG. 2, a cylindrical band 54 with a window 56 formed therein surrounds at least a portion of the shell 40. The tubular portion 22 is decorated with two bands 58 and 60 of contrasting colors to indicate low tire pressure and correct tire pressure respectively when viewed through the window 56. Calibration of the unit is effected by applying a preset pressure to the valve stem and indicator assembly and then adjusting the band 54 until the appropriate color band 58 or 60 is displayed through the window 56 and then permanently securing the band 54 in that position. Rather than using the band 54, it is feasible to coat the shell 40 inside or outside with paint or other material in a pattern to define an indicator window. Calibration is less convenient or is impractical in that case.

In operation, when air pressure is applied through the tire stem to inflate the tire, the tire pressure pushes outwardly on the nipple portion 22 to oppose the force of the balance spring 38 so that as the tire pressure increases, the nipple 26 of the tire stem moves outwardly away from the rim 10. At low pressures the color band 58 would be visible through the window 56 but when the tire is inflated to its normal operating pressure, the color band 60 will be visible through the window 56 thereby giving an indication to an observer that the tire is correctly inflated. In the event of over inflation, the rims or stop members 37 of the spring retainers 34 and 20 meet to provide a positive stop so that the tire pressure does not over extend the convoluted section of the valve stem thereby avoiding damage to the valve stem and indicator assembly due to over pressure. Once the tire has been properly inflated, the indicator will continue to show the color band 60 through the window 56 unless there is a loss of tire pressure and the spring 38 overcomes the force of the tire pressure on the valve stem to withdraw the tubular portion 22 enough to display the color band 58 in window 56 to signify to an observer that the tire has low pressure.

It will thus be seen that the tire pressure indicator according to this invention provides an easily readable indicator of a low tire pressure condition. It will further be seen that the valve stem indicator assembly is of simple construction, easy to manufacture and reliable in operation. Also, the assembly can be adapted to tires operating in widely different pressure ranges simply by the selection of a proper balance spring 38 and fine calibration within the given pressure range is accomplished by the positioning of the indicator window 56.

The embodiments of the invention in which an exclusive property or privilege is claimed are defined as follows:

1. A tire pressure indicator coupled with a tire valve stem comprising
    a valve stem having an elastomeric base portion for sealingly engaging a tire rim aperture, an integral convoluted portion and an outer nipple portion connected to the convoluted portion for axial movement with respect to the base portion in response to changes in tire pressure,
    a tire stem valve secured in the nipple portion to admit air under pressure through the stem to a tire and to retain said air,
    an elongated extension on the nipple portion passing through the base portion,
    spring means coupled between the base portion and the extension for yieldingly holding the nipple portion against the force of the tire pressure to control the nipple portion movement relative to the base portion in response to tire pressure, and
    indicator means coupled between the base portion and the nipple portion and responsive to the relative portions thereof to provide an indication of tire pressure.

2. A tire pressure indicator coupled with a tire valve stem comprising
    a valve stem having an elastomeric base portion for sealingly engaging a tire rim aperture, an integral convoluted portion and an outer nipple portion connected to the convoluted portion for axial movement with respect to the base portion in response to changes in tire pressure,
    a tire stem valve secured in the nipple portion to admit air under pressure through the stem to a tire and to retain said air,
    an elongated extension on the nipple portion passing through the base portion,
    spring means coupled between the base portion and the extension for yieldingly holding the nipple portion against the force of the tire pressure to control the nipple portion movement relative to the base portion in response to tire pressure,
    a transparent cylinder secured to the base portion and surrounding the nipple portion, a mask on the cylinder defining a window for viewing a restricted portion of the nippled portion, and
    a marking on the nipple portion in registry with the window at a preset tire pressure so that the preset pressure is indicated when the marking is exposed through the window.

3. A tire pressure indicator coupled with a tire valve stem comprising
    a valve stem having an elastomeric base portion for sealingly engaging a tire rim aperture, an integral convoluted portion and an outer nipple portion connected to the convoluted portion for axial movement with respect to the base portion in response to changes in tire pressure,
    a tire stem valve secured in the nipple portion to admit air under pressure through the stem to a tire and to retain said air,
    an elongated extension on the nipple portion passing through the base portion,
    means for preventing excessive movement of the nipple portion with repsect to the base portion in the event of tire over pressure including coacting stop members on the base portion and the extension for engagement to limit travel of the nipple portion away from the base portion,
    spring means coupled between the base portion and the extension for yieldingly holding the nipple portion against the force of the tire pressure to control the nipple portion movement relative to the base portion in response to tire pressure, and
    indicator means coupled between the base portion and the nipple portion and responsive to the relative positions thereof to provide an indication of tire pressure.

4. A tire valve stem combined with a tire pressure indicator comprising
    a hollow elastomeric stem having a base portion for sealingly engaging a tire rim aperture, an outwardly extending tubular portion and an integral intermediate convoluted portion interconnecting the base and tubular portions for allowing longitudinal relative movement therebetween,
    a first spring retainer connected to the inner end of the base portion,
    a hollow metal nipple secured within the tubular portion and having an outer orifice and an inwardly elongated extension passing through and extending beyond the base portion and terminating at an inner end,
    a second spring retainer coupled to the inner end of the extension, the spring retainers having abutment portions coacting to limit the movement of the tubular portion away from the base portion,
    a spring compressed between the spring retainers for urging the nipple and the tubular portion inwardly,
    a tire stem valve secured within the nipple whereby air under pressure can be admitted through the orifice into a tire,
    an indicia marking on the tubular portion, and
    a cylinder secured to the base portion and surrounding the convoluted portion and the tubular portion, the cylinder carrying a transparent window for registry with the said indicia marking a signify the tire pressure,
    whereby tire pressure acting outwardly on the nipple against the spring determines the extension of the convoluted portion to position the indicia marking relative to the indicator according to the pressure magnitude.

* * * * *